July 16, 1929. A. H. WORREST 1,720,870
ATTACHMENT FOR STEERING MECHANISM
Filed Sept. 30, 1925
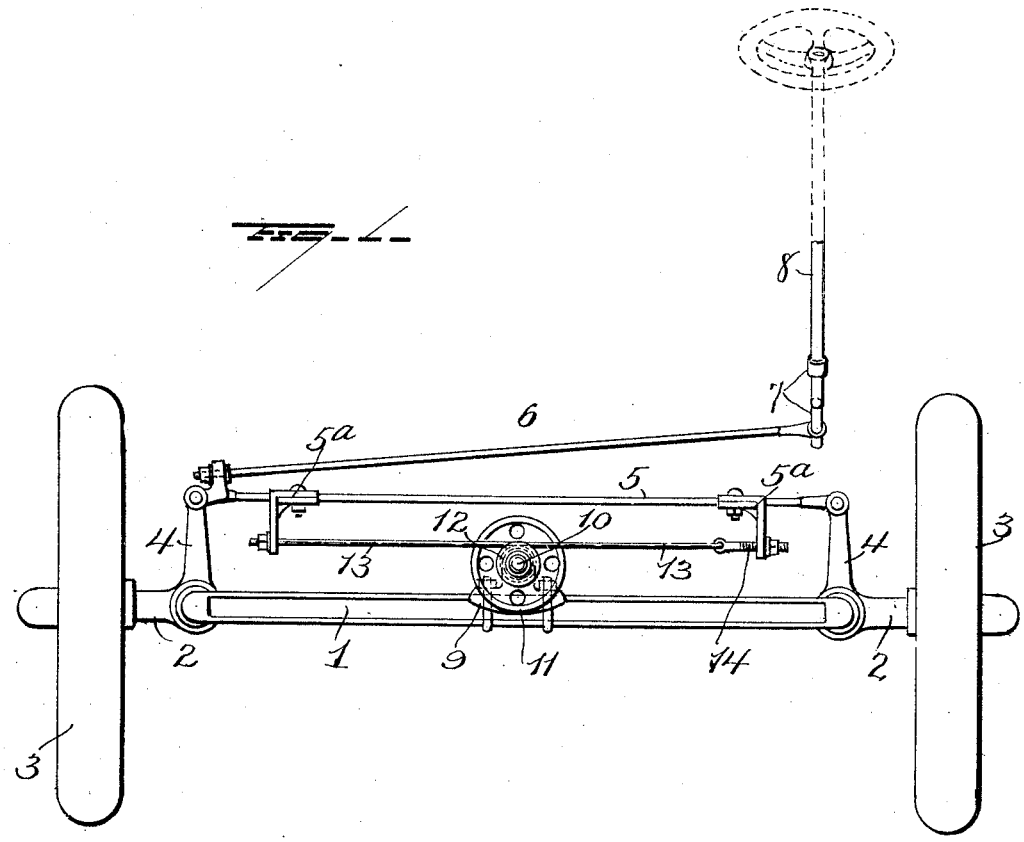

Patented July 16, 1929.

1,720,870

UNITED STATES PATENT OFFICE.

ALFRED H. WORREST, OF LANCASTER, PENNSYLVANIA.

ATTACHMENT FOR STEERING MECHANISM.

Application filed September 30, 1925. Serial No. 59,685.

This invention relates to improvements in attachments for steering mechanism of automobiles, and more particularly to means for counteracting the tendency of the steering wheels to vibrate or "shimmy",—one object of the invention being to so connect a weight member with the steering mechanism that said weight member will operate as a positive resistance to such sudden movements of the steering ground wheels as might tend to cause shimmying of said wheels, and to accomplish such resistance without interfering with or making more laborious the normal operation of steering.

A further object is to so connect a weight member with steering mechanism that any sudden tendency of the steering wheels to shimmy will be immediately resisted by said weight member.

With these and other objects in view, the invention consists in certain novel features of construction and combinations of parts as hereinafter set forth and pointed out in the claims.

The accompanying drawing is a view showing one embodiment of my invention.

In the drawing, 1 represents the front axle of an automobile or other vehicle, to respective ends of which, spindles 2 for wheels 3 are pivotally supported and provided with arms 4, preferably disposed at right angles to the spindles 2. The arms 4 are connected by a cross-rod 5 and one of said arms 4 of the cross-rod 5 will be connected by a rod 6 and a crank 7 with the steering column 8,—all of which construction is well known.

A bearing bracket 9 is secured to the axle 1, preferably at the center thereof, and serves as a mounting for the axle 10 of a revoluble balanced weight or fly-wheel 11. A drum or pulley 12 is rotatable with the weight or flywheel 11 and about this drum, the intermediate portion of a flexible device, such as a cord or wire cable 13 is wound,—the respective ends of said wire cable being connected with the arm 4 of the respective wheel spindles, preferably through the medium of brackets 5ᵃ secured to the cross rod 5. If desired one end of the cable may have a movable or adjustable connection with one of the brackets 5ᵃ as indicated at 14 to facilitate the taking up of slack in the cable.

The construction above described provides a balance weight connected with the steering gear and operable to resist vibration of the steering wheels at the instant that one of them engages an obstruction and thus shimmying of the steering wheels will be prevented as the weight will offer an immediate resistance to any tendency of the wheels to shimmy. These results are accomplished without offering appreciable resistance to the normal operation of the steering mechanism.

Various changes might be made in the details of construction of my invention without departing from the spirit of the latter without limiting its scope, and hence I do not wish to restrict myself to the precise construction herein set forth.

Having fully described my invention what I claim as new and desire to secure by Letters-Patent, is:—

1. The combination with stationary axle, wheel spindles having pivotal connection with said axle, arms movable with said spindles, and steering mechanism connected with said arms, of a revoluble weight supported by said axle, a drum revoluble with said weight, and a flexible device having its intermediate portion wound on said drum and having its respective ends connected with the respective arms of the wheel spindles.

2. The combination with a stationary axle, wheel spindles having pivotal connection with said axle, arms movable with said spindles, and steering mechanism connected with said arms, of a revoluble weight supported by said axle, a drum revoluble with said weight, a flexible device having its intermediate portion wound on said drum and having its respective ends connected with the respective arms of the wheel spindles, and means permitting adjustment of the cable to take up slack.

3. In a vehicle, the combination with a stationary axle, wheel spindles having pivotal connection with said axle, arms movable with said spindles, a cross rod connecting said arms, and operating means connected with said cross rod, of a revoluble weight supported by the axle, a drum revoluble with said weight, brackets carried by said cross rod, and a flexible device connected with said brackets and wound on said drum.

In testimony whereof, I have signed this specification.

ALFRED H. WORREST.